United States Patent [19]

Ooms et al.

[11] 4,310,479

[45] Jan. 12, 1982

[54] PROCESS FOR MAKING TRANSPARENT VARIEGATED SOAP BARS

[75] Inventors: Julius Ooms, Langdorp, Belgium; Bernard Retureau, Cincinnati, Ohio; Andre Imbaud, Venelles, France

[73] Assignee: The Procter & Gamble Company, Cincinnati, Ohio

[21] Appl. No.: 187,372

[22] Filed: Sep. 15, 1980

[30] Foreign Application Priority Data

Sep. 14, 1979 [GB] United Kingdom ............... 32032/79

[51] Int. Cl.[3] ................................................ B29F 3/12

[52] U.S. Cl. ...................................... 264/37; 252/134; 252/367; 264/75; 264/101; 264/141; 264/320; 264/DIG. 69

[58] Field of Search ................... 264/37, 75, DIG. 69, 264/101, 102, 320, 141; 425/73, 75, 217, 131.1, 203; 252/134, 367-368, 370-371

[56] References Cited

U.S. PATENT DOCUMENTS

| | | | |
|---|---|---|---|
| 2,185,653 | 1/1940 | Thurman | 252/371 |
| 2,970,116 | 1/1961 | Kelly et al. | 252/368 |
| 3,485,905 | 12/1969 | Compa et al. | 264/102 |
| 3,673,294 | 6/1972 | Matthaei | 264/37 |
| 3,784,533 | 1/1974 | Mach | 264/37 |
| 3,969,259 | 7/1976 | Lages | 252/122 |
| 3,993,722 | 11/1976 | Borcher et al. | 264/75 |
| 4,077,754 | 3/1978 | Borcher et al. | 425/131.1 |
| 4,092,388 | 5/1978 | Lewis | 264/75 |

FOREIGN PATENT DOCUMENTS

| | | | |
|---|---|---|---|
| 1162999 | 9/1956 | Fed. Rep. of Germany | 264/102 |

*Primary Examiner*—Jeffery R. Thurlow

[57] ABSTRACT

A process for producing transparent variegated soap bars, wherein soap scrap material resulting from the formation of the soap bars is reintroduced into the process by adding it into the final extrusion device, e.g., the plodder. An apparatus for carrying out this process is also described.

8 Claims, 1 Drawing Figure

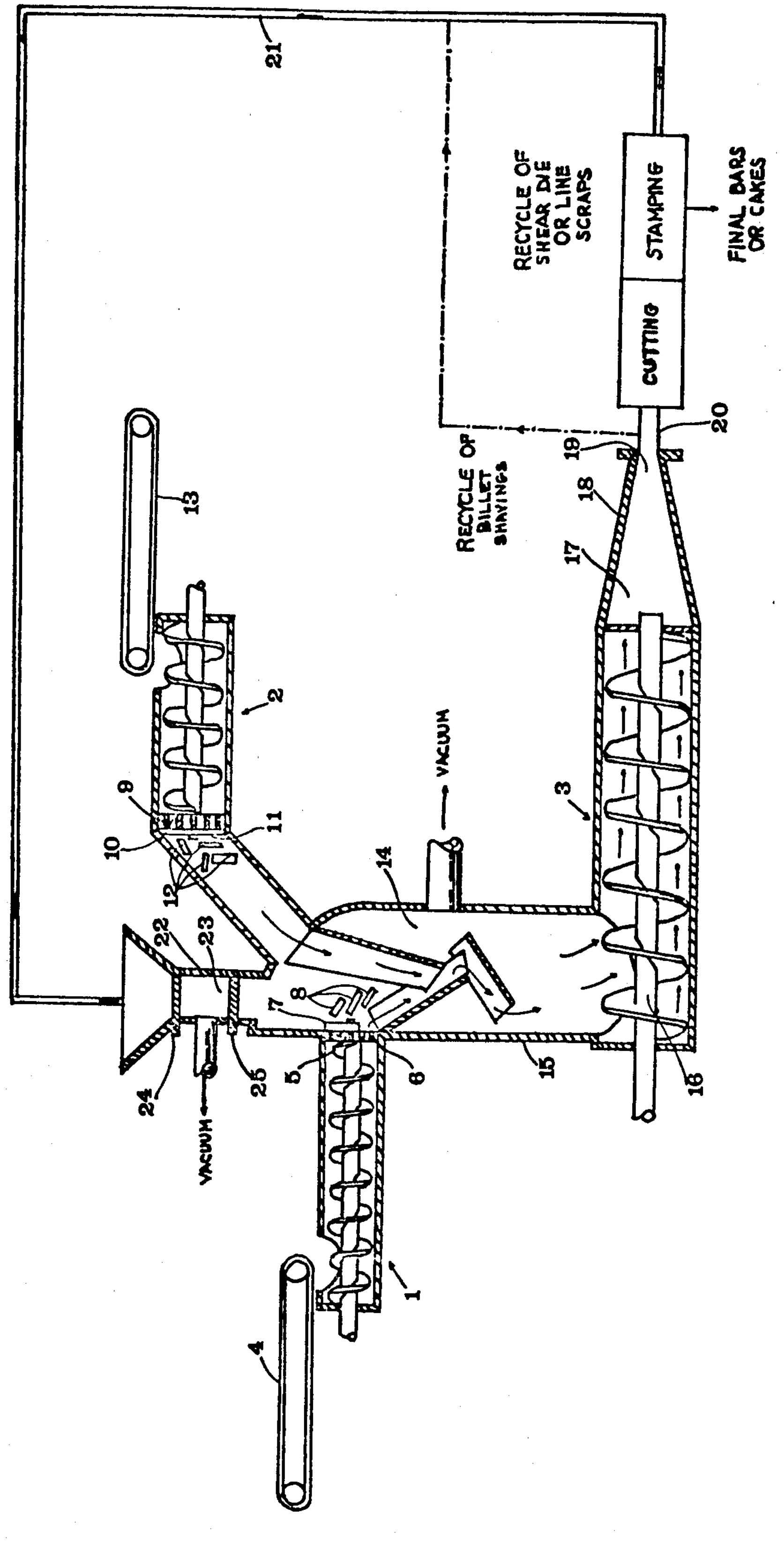
RECYCLE OF SHEAR DIE OR LINE SCRAPS
CUTTING
STAMPING
FINAL BARS OR CAKES
RECYCLE OF BILLET SHAVINGS
VACUUM
VACUUM

PROCESS FOR MAKING TRANSPARENT VARIEGATED SOAP BARS

TECHNICAL FIELD

The present invention constitutes an improvement in the process for producing transparent variegated soap bars made by the commingling and subsequent extrusion of transparent and opaque soap noodles. Specifically, the process described herein constitutes a method for efficiently and effectively recycling the soap scrap material which results from such a process.

BACKGROUND OF THE INVENTION

Processes for making variegated soap bars by commingling colored and non-colored soap noodles and extruding the resulting soap mass are well-known in the art. See, for example, U.S. Pat. No. 3,993,722, Borcher et al., issued Nov. 23, 1976, and U.S. Pat. No. 4,077,754, Borcher et al., issued Mar. 7, 1978, both of which are incorporated herein by reference. Generally these variegations are in the form of linear or curved stripes, however they may be markings of any type. Although these processes generally relate to the manufacture of opaque variegated soap bars, they can be adapted to the manufacture of transparent variegated soap bars by utilizing mixtures of transparent and opaque soap noodles. In such a process, the actual formation of the soap bars, by a stamping operation, results in the formation of soap scraps which are substantially transparent, although they generally do contain some opaque portions (these opaque portions may, for example, correspond to the opaque stripes in the soap bar). The scraps must either be wasted or recycled, by some means, back into the soap manufacturing process.

While processes for making uniformly transparent soap bars are well-known (e.g., U.S. Pat. No. 3,155,624, Kelly, issued Nov. 3, 1969 and U.S. Pat. No. 3,969,259, Lages, issued July 13, 1976, both of which are incorporated herein by reference), the scrap soap recycling techniques generally used in such processes (i.e., reintroduction of the soap scraps into the amalgamator, the roll mills or the preliminary plodder) are not useful in making transparent variegated soap bars, since such operations yield a substantial mixing of the transparent soap scraps with opaque soap noodles, resulting in a loss of the transparency of the soap scrap material. It is to be emphasized that this problem only exists in the manufacture of transparent variegated soap bars since that process utilizes both transparent and opaque soap noodles. One solution to the problem would be to recycle the scrap material back into the kettle at the start of the soap-making process; however, this approach is inefficient since it results in a loss of perfume and free fatty acid components already in the scrap material, as well as extensive and unnecessary reworking of the scrap material.

It is, therefore, an object of the present invention to provide a process for the manufacture of transparent variegated soap bars which includes an efficient and effective method of recycling the scrap soap material formed by said process.

It is a further object of the present invention to provide an efficient method for recycling soap scrap material formed in a soap-making process which utilizes both transparent and opaque soaps.

It is a still further object of the present invention to provide a method for recycling soap scrap material which minimizes the loss of free fatty acid and perfume components used in said material.

These and other objects apparent to one skilled in the art are accomplished using the process described herein.

SUMMARY OF THE INVENTION

The present invention comprises an improvement in the continuous process for the manufacture of transparent variegated soap bars which includes the sequential operations of: (a) mechanical working of soap material to form separate soap masses, at least one of which is transparent; (b) the separate extrusion of each of said soap masses to form soap noodles; (c) the commingling of said soap noodles; (d) the final extrusion of said commingled soap noodles using an extrusion device; and (e) the forming of soap bars from said extruded soap. In this improvement, the soap scrap material resulting from the formation of the soap bars is reintroduced into said process by adding it into the final extrusion device.

The apparatus for carrying out this process comprises: (a) at least two preliminary plodders which include means for forming soap noodles; (b) a vacuum chamber located in a position to receive said soap noodles and pass them to a final extrusion plodder; and (c) means for forming the soap extruded from said final extrusion plodder into soap bars; characterized in that said apparatus additionally comprises a means for adding scrap soap, resulting from formation of the soap bars, into said vacuum chamber without breaking the vacuum therein.

DETAILED DESCRIPTION OF THE INVENTION

This invention comprises an improvement in the continuous process for manufacturing transparent variegated soap bars; the basic process utilizes the following steps:

(a) soap material is mechanically worked to form two or more separate soap masses, at least one of which is transparent;

(b) the soap masses are each extruded to form soap noddles;

(c) the soap noodles so formed are commingled;

(d) the commingled soap noodles are extruded using an extrusion device (referred to herein as "the final extrusion device"), such as a plodder or preferably, a vacuum chamber/plodder combination; and (e) soap bars are formed from said extruded soap.

Such a process for forming variegated soap bars is well-known in the art and is, together with an apparatus for carrying out said process, described in detail in U.S. Pat. No. 3,993,722, Borcher et al., issued Nov. 23, 1976, and U.S. Pat. No. 4,077,754, Borcher et al., issued Mar. 7, 1978, both of which are incorporated herein by reference. The process of the present invention and a cross-sectional view of an apparatus used to carry out this process are illustrated in the drawing which accompanies this application; the reference numerals which appear throughout the application refer to this drawing.

In this process, at least two, and possibly more, separate soap masses are formed by methods known in the art. At least one of these soap masses must be transparent; the benefits of the present invention are best seen when, in addition, at least one of the soap masses formed is opaque. Any or all of these soap masses may be colored. It is through the controlled mixing of these transparent and opaque soap masses that transparent variegated soap bars are formed. As used herein, the term "transparent" indicates a soap through which sufficient light passes so as to permit boldfaced type of about 14 point size to be read through a thickness of a quarter inch. The term "opaque" as used herein, indicates a soap which does not meet this criterion. Additional methods for determining soap transparency, such as the translucency voltage, described in U.S. Pat. No. 3,155,624, Kelly, issued Nov. 3, 1964, incorporated herein by reference, are also known in the art.

For purposes of this invention, the term "soap mass" refers to any conventional combination of detersive surfactant materials, including true soap, and other soap bar or cake adjuvants, which can be plodded into a final soap bar or cake. Such soap masses can be made from a variety of well-known detersive surfactant compounds including anionic, nonionic, cationic, amphoteric and ampholytic surfactants and compatible combinations thereof. Typical of such surfactants are the organic detergents listed at columns 8, 9 and 10, lines 27-75, 1-75, and 1-52 respectively of U.S. Pat. No. 3,714,151, Lyness, issued Jan. 30, 1973, incorporated herein by reference. Particular soap mass compositions capable of being plodded are well-known in the art.

Preferred soap mass compositions are prepared from water-soluble soaps which include sodium, potassium, ammonium and alkanol-ammonium (e.g., mono-, di- or triethanolammonium) salts of higher fatty acids (e.g., $C_{10}$–$C_{24}$) as a major component. Particularly useful are the fatty acids derived from coconut oil and tallow, i.e., sodium and potassium tallow and coconut soaps. Preferred major soap mass constituents are tallow and coconut soap mixtures having weight ratios of tallow to coconut soap of from 95:5 to 5:95. Particularly preferred soap masses are those which comprise from about 40% to 90% by weight tallow soap and/or those which comprise about 10% to 60% coconut soap.

The soap masses are generally prepared through conventional milling and, possibly, plodding steps, well-known in the art. The soap mass begins typically as a kettle or hydrolyser soap which is dried and then mixed with desired adjuvants, such as perfume, fillers, emollients, water and salt, is thereafter milled into chips, pellets, noddles or other form suitable for preliminary plodding, and is transported to the preliminary plodder by, for example, a conveyor belt (4, 13).

The soap masses further can contain the conventional additives or adjuvants used in soaps. Such additives include free fatty acid, perfumes, bacteriostats, sanitizers, abrasives, perservatives or emollients along with the usual moisture content of from about 8% to 14% water, and salt content of from about 0.1% to about 2% sodium chloride or similar electrolyte. The use of non-conventional electrolytes, particularly potassium carbonate, in transparent soaps to minimize the formation of surface crystals is disclosed in British Application No. 79 04179, Rasser, Soap Bars, filed Feb. 6, 1979, incorporated herein by reference.

Each of the soap masses formed as described above is then separately extruded, such as by a preliminary (or pre-) plodder (1,2) with an extrusion plate (5,6,9,10) and a cutting edge (7,11), to form soap noodles (8,12). At least one group of these noodles must be made from transparent soap and, in a preferred process of the present invention, at least one group will be made from opaque soap. These noodles are then commingled and extruded, typically using a plodder (3), to form a soap log (20). In a preferred embodiment of this process, the noodles are commingled and fed into the final plodder through a vacuum chamber (14), generally having a pressure of from about 63 to about 74 cm. of mercury. The use of the vacuum chamber prevents improper fusing of the soap noodles.

At the point at which they are commingled and extruded, the moisture content differential between individual groups of noodles should be maintained within about 3% by weight, and preferably less. This prevents improper fusing of the noodles and smearing of the variegations in the final plodder.

The soap log extruded from the final plodder is preferably kept between 25° C. and 40° C. by means of a cooling jacket surrounding the final plodder housing. If the temperature of the soap log at this stage is allowed to rise above about 43° C., then undesirable smearing of the variegated pattern can occur. In usual operations, the soap log is extruded from the plodder at pressures of from about 100 to about 350 pounds per square inch (about 7 to 24.5 kg./sq. cm.), preferably at 150–200 psi (10.5–14 kg.sq. cm.). At higher pressures, smearing of colors can occur.

It is in the process of transforming this soap log into individual soap bars that the soap scrap, which is recycled using the process of the present invention, is formed. Generally the scrap is formed by the operations in which the soap log is cut into pieces of the proper soap bar thickness and those pieces are stamped to form finished variegated soap bars. This stamping process is described in detail in British Specification No. 1,438,763, Murray, filed Aug. 11, 1972, incorporated herein by reference. The soap scrap may also be formed by shaving the outside edges of the extruded soap log in order to eliminate smeared surface variegations which can occur during the extrusion step or may consist of "line scrap", i.e., finished soap bars which do not meet production standards.

For most advantageous results in the present invention, the soap scrap which is recycled back into the soap-making process should be from about 0.5 to 110.5 mm, and preferably from about 2 to 44 mm, thick. It is preferred that the recycled soap scraps be at least partially transparent, i.e., at least portions of the scrap material should satisfy the definition of "transparency", as given above; this would generally be the case where transparent and opaque soap noodles are used in forming the soap bars, yielding soap scraps having both opaque areas and transparent areas. It is even more preferred that the recycled scrap materials are substantially completely transparent, i.e., where the scrap material is transparent over most or all of its area; this may be the case where the main body of the soap, as well as the variegations, is formed from transparent soap, or even when the main body of the soap is formed from opaque soap if the soap scraps are sufficiently thin. The scraps should not be cut too thin, otherwise the cutting action itself, eliminates the transparency from the soap scrap material; however, if the scraps are relatively thin (such as those formed by peeling the edges of the soap billet), i.e., from about 0.5 to 15 mm, preferably from about 0.5 to about 2 mm thick, even the portions of the scrap material formed from opaque soap noodles will be relatively transparent.

In the present invention, the soap scrap material formed is transported back to the final extrusion device, as by a conveyor belt (21) and is reintroduced into the soap bar making process at the final extrusion device, which generally comprises a plodder (step (d)) above).

The final extrusion device preferably comprises a vacuum chamber together with the plodder. Here, the scrap is mixed with the transparent and opaque soap noodles already in the mainstream of the process and reextruded into a soap log from which soap bars are formed, creating new scrap material and the recycle process is repeated. The soap scraps may be reintroduced into the final plodder in the form in which they are produced, or they may be cut into pieces, prior to their reintroduction into the process. The scrap materials should not be reintroduced into the process at any step earlier than (c) or (d), described above; reintroduction at an earlier process stage (e.g., at the preplodding stage) would result in substantial mixing of the transparent scraps with relatively opaque soap, resulting in loss of the transparency of the scrap material.

The soap scraps need not be, and preferably are not, reworked (e.g., renoodled) prior to their reintroduction into the final plodder; any such substantial reworking has the undesirable effect of reducing the transparency of the scrap material. Further, it is preferred that the scrap materials are introduced into the final extrusion device through the vacuum chamber. In doing this, the operation must be carried out in a manner which does not break the vacuum in the vacuum chamber. This may be accomplished using a "lock" device (22) which consists of an inner air-tight gate valve (e.g., a slide valve) leading into the chamber (25), an area above this valve which may be evacuated (23), and an outer air-tight gate valve (24) between this area and, for example, a feed hopper. The soap scrap is fed into the evacuatable area through the outer gate valve, which is then closed, the pressure in this area is then reduced to that in the vacuum chamber and the inner gate valve is opened, releasing the scrap material into the vaccum chamber.

As used herein, all percentages and ratios are given by weight, unless otherwise specified.

The following non-limiting example illustrates the process of the present invention.

EXAMPLE

A transparent variegated soap bar, having a yellow transparent base with white opaque stripes was made in the following manner, using the apparatus illustrated herein.

A transparent yellow soap was prepared by amalgamating and drying about 93 parts of a 30% moisture kettle base soap (made from 50% tallow and 50% coconut oil), 6.8% top-hardened coconut fatty acid, with the remainder being a mixture of preservative, sequestrant and antioxidant. The soap produced had a moisture content of about 10%. Subsequently, yellow dye and perfume were added to the soap, the amalgamated soap was passed over a double set of mills, and the ribbons resulting from the milling operation were conveyed into the preliminary plodder. The yellow transparent soap noodles formed had diameters of about 4.5 mm.

Simultaneously, a white opaque soap was produced by amalgamating together about 98.5% of the kettle base soap used above with minor ingredients, such as titanium dioxide, perfume and moisture. Part of this base soap may be replaced by opaque soap scrap material formed later in the process. After amalgamation of the above ingredients, the soap was passed over a double set of mills. The white soap ribbons formed by the mills were then conveyed to a second preliminary plodder, where they were formed into soap noodles having diameters of from about 17 to about 24 mm.

In the vacuum chamber, the soap was commingled in the following proportions:

3.5 parts of yellow transparent soap noodles
1.0 part of white opaque soap noodles
1.5 parts of substantially transparent scrap material.

The scrap material was added to the vacuum chamber through a "lock" device, such as that described previously in this application, which permits addition to the vacuum chamber without breaking the vacuum. The soap scrap consisted of line scraps and the scraps formed by the stamping of soap bars from the soap billet (although substantially similar results would be obtained if the scrap material also included the material formed by shaving the edges of the soap billet); the scrap generally had a thickness of from about 2 to about 44 mm. The commingled soap was passed into the final plodder where it was extruded from the plodder orifices to form a transparent variegated soap billet; the billet temperature was maintained at about 26.5 to about 29° C. after extrusion. The surfaces of the billet were peeled, at a thickness of from about 0.5 to about 2 mm, to minimize smearing of the variegations. The billet was then cut into pieces at intervals of 117 mm and diagonally stamped to form the desired transparent variegated soap bars. Each stamping operation formed two or four substantially transparent soap scraps, i.e., they comprise mostly yellow transparent soap with some white opaque variegations. This scrap material was taken by conveyor belt to the vacuum chamber where they were recycled back into the vacuum chamber, as described above.

This manufacturing process produced yellow/white transparent soap bars of a uniformly high quality, and provided a very effective and efficient method for recycling the scrap material produced.

We claim:

1. A continuous process for the manufacture of transparent variegated soap bars wherein scrap soap is recycled without loss of transparency, said process comprising the steps of (a) separately forming opaque soap noodles and transparent soap noodles;
(b) introducing separate streams of the opaque noodles and the transparent noodles into a vacuum chamber and commingling them therein;
(c) separately introducing scrap soap into the vacuum chamber;
(d) feeding the noodles and scrap soap from the vacuum chamber into a plodder and extruding the noodles and scrap soap therein to form a soap log;
(e) forming the soap log into soap bars.

2. A process as recited in claim 1, in which the noodle forming processes each involve mechanical working to form a soap mass and then extruding to form soap noodles.

3. The process according to claim 12 wherein said scrap soap is not significantly reworked prior to its addition to said plodder.

4. The process according to claim 3 wherein said scrap soap contains a mixture of opaque and transparent soap.

5. The process according to claim 3 wherein said scrap soap is substantially completely transparent.

6. The process according to claim 4 wherein the pieces of said scrap soap are from about 0.5 mm to about 110.5 mm thick.

7. The process according to claim 6 wherein said scrap soap is formed, at least in part, by stamping the extruded soap to form soap bars.

8. The process according to claim 6 wherein said scrap soap is formed, at least in part, by shaving the edges of the extruded soap.

* * * * *

UNITED STATES PATENT AND TRADEMARK OFFICE

CERTIFICATE OF CORRECTION

PATENT NO. : 4,310,479

DATED : January 12, 1982

INVENTOR(S) : Julius Ooms et al.

It is certified that error appears in the above-identified patent and that said Letters Patent are hereby corrected as shown below:

Claim 3, line 1, "12" should be --2--.

Signed and Sealed this

*Sixth* Day of *April 1982*

|SEAL|

*Attest:*

GERALD J. MOSSINGHOFF

*Attesting Officer* *Commissioner of Patents and Trademarks*